(No Model.) W. F. WILLIAMS. 3 Sheets—Sheet 1.
DRIVING GEAR FOR BICYCLES.
No. 599,211. Patented Feb. 15, 1898.
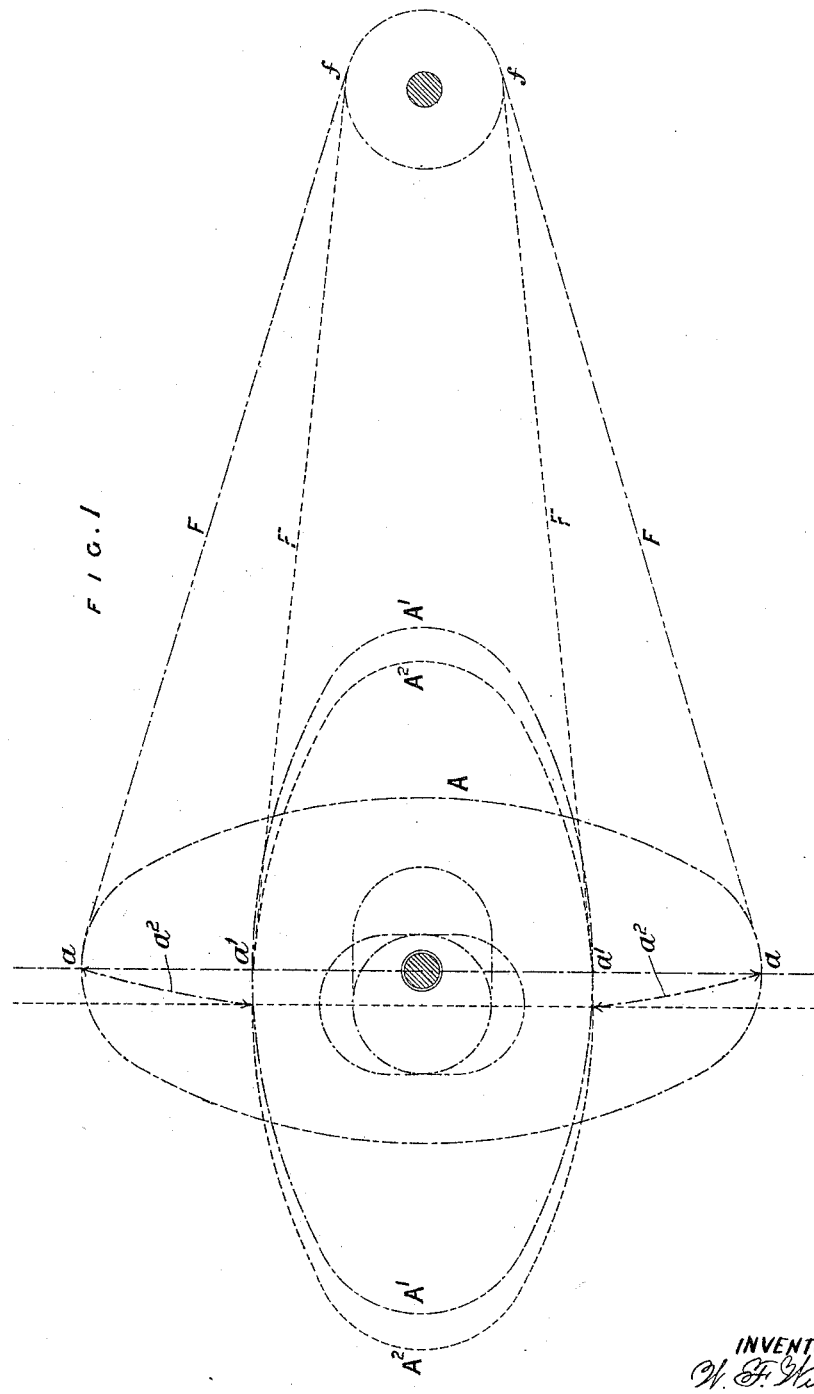
WITNESSES.
INVENTOR:
W. F. Williams.
BY
ATTORNEYS.

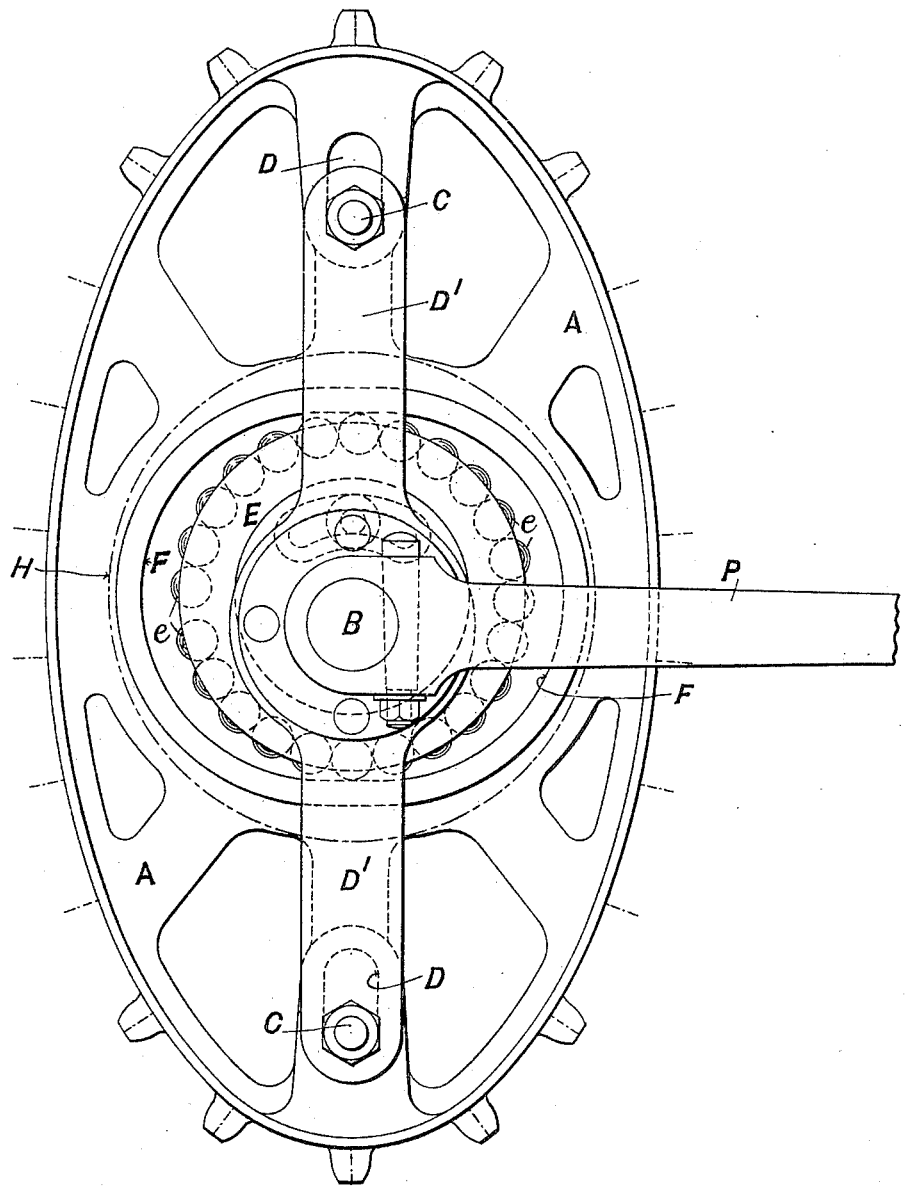

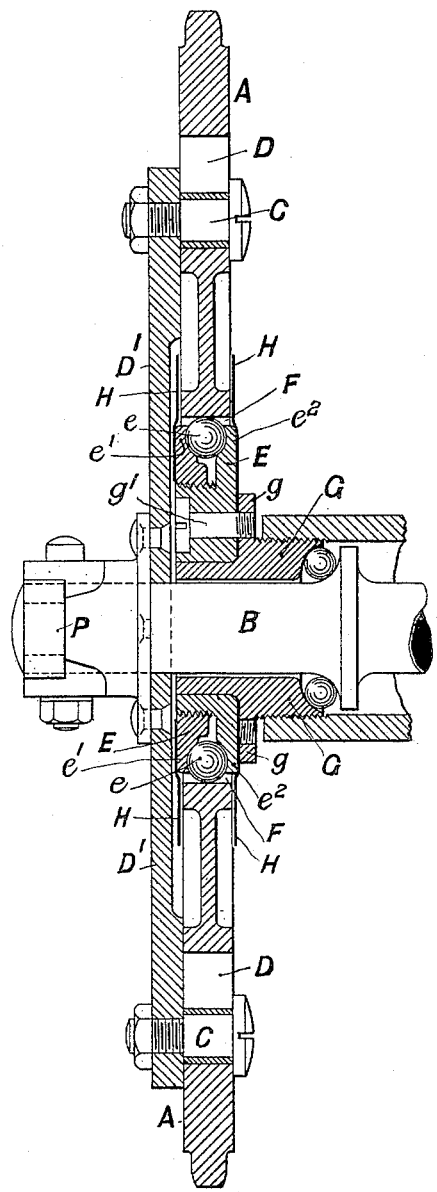

UNITED STATES PATENT OFFICE.

WILLIAM FREDERICK WILLIAMS, OF LONDON, ENGLAND.

DRIVING-GEAR FOR BICYCLES.

SPECIFICATION forming part of Letters Patent No. 599,211, dated February 15, 1898.

Application filed March 19, 1897. Serial No. 628,327. (No model.) Patented in England December 24, 1896, No. 29,661; in France February 18, 1897, No. 264,182, and in Belgium February 19, 1897, No. 126,447.

*To all whom it may concern:*

Be it known that I, WILLIAM FREDERICK WILLIAMS, gentleman, of 32 Shaftesbury avenue, London, W., England, have invented new and useful Improvements in the Driving-Gear of Bicycles and other Pedal-Operated Vehicles or Machines, (for which patents have been obtained in Great Britain, No. 29,661, dated December 24, 1896; in France, No. 264,182, dated February 18, 1897, and in Belgium, No. 126,447, dated February 19, 1897,) of which the following is a full, clear, and exact description.

My invention relates to driving chain-gear of bicycles and other pedal-operated vehicles and machines in which the ratio of the gear during the revolution is so varied by means of an elliptic sprocket-wheel (geared by a chain with a circular wheel or it may be with another elliptical wheel) that the effective leverage of the pedals is decreased at the dead-points and increased at the points where power may be most advantageously applied.

The object of my invention is to maintain constant the tension of the chain, notwithstanding the varying effective ratio of the driving and driven sprocket-wheels, by causing the one wheel to move in its own plane so as to compensate for the varying length of chain required at certain points in the revolution consequent on the varying angular relation of the two straight portions of the chain.

The invention will be described with reference ence to the accompanying drawings, forming part of this specification, wherein—

Figure 1 is a diagram illustrating the combination of an elliptic driving sprocket-wheel with a circular sprocket-pinion and the motion of the former in its own plane, whereby the slack of the chain is taken up at required moments. Fig. 2 is a face view, and Fig. 3 a section, on the major axis of the elliptic sprocket-wheel, showing the means by which the motion of the wheel in its own plane is produced.

The elliptic sprocket-wheel A is loose on the pedal-axle B, but is connected thereto so as to insure a driving connection therewith by any suitable means—such, for instance, as studs C, playing in slots D in the direction of the major axis of the ellipse, the studs being fixed to arms D' on a hub keyed on the pedal-axle and the slots being made in the web of the wheel, or vice versa, so as to permit of a sliding motion of the wheel A in its own plane relatively to the pedal-axle B. This motion is communicated to the wheel A by a stationary disk E, eccentric to the axis of the pedal-axle, working in a transverse oblong slot F in the boss of the wheel A, the width of the slot in the direction of the major axis of the elliptic wheel corresponding to the diameter of the eccentric disk, so that the wheel in revolving about the eccentric is constrained by the eccentric to move along the direction of its major diameter, the position of the eccentric and its effective radius being such that the direction of this motion of the sprocket-wheel is toward and from the driven pinion, as shown in Fig. 1, so as to accommodate the varying length of chain required in the different positions assumed by the elliptic wheel during its revolution. The necessity for this compensation will be apparent from the diagram. Assuming the elliptic wheel to be in the position indicated by A, the distance of the extremity $a$ of the major diameter of the ellipse from the corresponding tangent-point $f$ of the chain F with the driven pinion is greater than would be the distance of the extremity $a'$ of the minor diameter of the ellipse from the same point were the elliptic wheel turned a quarter round upon the axis of the pedal-axle as a center, as shown by A', the difference being approximately equal to the versed sine of the arc $a^2$. This difference is compensated by the action of the eccentric, by which the ellipse in turning is gradually moved to the position A², so as to maintain the tension of the chain.

The eccentric E may be carried by the screw-gland G of the pedal-axle ball-bearing, and if made in one therewith the adjustment of the pedal-axle bearings for wear would be taken up by the gland at the opposite side of the machine. In order, however, to provide for the independent adjustment of the gland G and eccentric, the eccentric may be mounted on an outwardly-projecting boss $g$, formed on the gland, and be secured by a set-screw $g'$, passing through a slot in the eccentric and screwing into any one of a ring of holes tapped in the disk of the gland, so that the eccentric may be adjusted in proper position, notwithstanding the circular adjustment of the gland, which in any case would be locked in position to which it is set by usual means. By merely substituting the eccentric-carrying gland for the ordinary one the improved gear may be readily applied to an existing machine, or the eccentric may be mounted in position in any other suitable way.

In order to diminish friction between the eccentric and the sides of the slot in which it works, the eccentric is provided with a peripheral set of balls $e$, running in a grooved path formed around the eccentric and retained therein by the converging flanges $e'\, e^2$, between which the balls project sufficiently to come in contact with the sides of the slot F. To provide for easy renewal in case of wear beyond what can be taken up by adjustment of the ball-bearing paths, the slot F may have a steel liner-ring fitted in it, as will be easily understood, which may be replaced by a new one when worn. Circular cover-plates H are fixed at each side of the eccentric and inclose the slot, so as to exclude dust.

The pedal-cranks P are fixed to their axle B at right angles to the major diameter of the elliptic wheel or in such other angular relation thereto as will give the most effective result.

I have described the tensional compensating motion as applied to an elliptic wheel driving a circular pinion; but it will be obvious that both might be elliptic and that the same effect would be produced were the compensating motion to be applied to a circular wheel used in connection with an elliptic wheel, so that the compensating motion might theoretically be applied to the driven wheel or pinion, or the driving-wheel may be circular and compensating and the driven wheel or pinion may be elliptic, provided that the ratio between the driving and driven wheels is as two (or a multiple thereof) to one. For constructional reasons, however, the compensation would be generally applied to the driving-wheel.

The elliptic chain wheel or wheels need not be toothed around the entire periphery, it being sufficient for driving purposes to provide a certain number of teeth at each end of the ellipse, leaving the greater portion of the sides of the ellipse devoid of teeth, but grooved for the chain to lie in.

It will be obvious that various modifications may be made within the scope of the appended claims.

I claim—

1. In an elliptic chain-gear, the combination, with the chain-wheel in driving connection with its axle but free to move relatively thereto in its own plane, of a stationary guide or actuating device arranged to effect a positive movement of said wheel in its own plane in such a manner as to accommodate the varying length of chain required at different points in the revolution of the gear, substantially as specified.

2. In an elliptic chain-gear, the combination, with the chain-wheel in driving connection with its axle by studs and slots permitting of motion of the wheel in its own plane relatively to the axle, of a stationary eccentric by which the wheel is constrained to move in its own plane in such manner as to accommodate the varying length of chain required at different points in the revolution of the gear substantially as specified.

3. In an elliptic chain-gear, the combination, with the chain-wheel in driving connection with its axle but free to move relatively thereto, of a stationary eccentric mounted upon the adjacent gland of the pedal-axle ball-bearing, the eccentric engaging in a transverse slot in the wheel so that the latter in revolving about the eccentric is constrained to move in its own plane in such manner as to accommodate the varying length of chain required at different points in the revolution of the gear substantially as specified.

4. In an elliptic chain-gear the combination, with the chain-wheel in driving connection with its axle but free to move relatively thereto, of a stationary eccentric mounted upon the adjacent gland of the pedal-axle ball-bearing with capability of independent adjustment of the eccentric and gland, the eccentric engaging in a transverse slot in the wheel so that the latter in revolving about the eccentric is constrained to move in its own plane in such manner as to accommodate the varying length of chain required at different points in the revolution of the gear substantially as specified.

WILLIAM FREDERICK WILLIAMS.

In presence of—
T. W. KENNARD,
FRED C. HARRIS.